(12) United States Patent
Baryshnikov (10) Patent No.: US 9,574,558 B2
(45) Date of Patent: Feb. 21, 2017

(54) HIGH PRESSURE GEAR PUMP WITH DUAL WALL HOUSING

(71) Applicant: Dmitriy Baryshnikov, Rockford, IL (US)

(72) Inventor: Dmitriy Baryshnikov, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 14 days.

(21) Appl. No.: 14/211,754

(22) Filed: Mar. 14, 2014

(65) Prior Publication Data

US 2015/0260183 A1  Sep. 17, 2015

(51) Int. Cl.
| | | |
|---|---|---|
| *F01C 1/18* | (2006.01) |
| *F03C 2/00* | (2006.01) |
| *F03C 4/00* | (2006.01) |
| *F04C 2/00* | (2006.01) |
| *F04C 2/08* | (2006.01) |
| *F04C 2/18* | (2006.01) |
| *F04C 13/00* | (2006.01) |
| *F04C 15/00* | (2006.01) |

(52) U.S. Cl.
CPC .......... *F04C 2/086* (2013.01); *F04C 2/18* (2013.01); *F04C 13/00* (2013.01); *F04C 15/0015* (2013.01)

(58) Field of Classification Search
CPC ............ F04C 2/18; F04C 2/086; F04C 2/088; F04C 18/08; F04C 18/084; F04C 18/086; F04C 15/0038; F04C 15/06; F04C 15/0023; F04C 15/0026; F04C 27/005; F04C 27/006; F04C 27/009; F04C 2240/50

USPC ............... 418/206.1–206.8, 15, 180, 86
See application file for complete search history.

(56) References Cited

U.S. PATENT DOCUMENTS

| | | | |
|---|---|---|---|
| 3,309,997 A * | 3/1967 | Kita ........................... 418/206.6 |
| 3,922,117 A | 11/1975 | Weatherston |
| 4,789,314 A | 12/1988 | Higuchi et al. |
| 5,273,412 A * | 12/1993 | Zwaans ..................... 418/201.1 |
| 7,479,000 B2 | 1/2009 | Klassen |
| 7,806,673 B2 | 10/2010 | Muscarella et al. |
| 8,092,202 B2 | 1/2012 | Matlack |
| 2010/0266437 A1 | 10/2010 | Martin-Dye |

FOREIGN PATENT DOCUMENTS

CN        102425544 A     4/2012

* cited by examiner

*Primary Examiner* — Theresa Trieu
(74) *Attorney, Agent, or Firm* — Reinhart Boerner Van Deuren P.C.

(57) ABSTRACT

A gear pump and gear pump housing are provided. The gear pump housing includes an inner wall and an outer wall. The inner wall defines an inner pumping cavity having a pumping cavity inlet and a pumping cavity outlet. The outer wall surrounds at least part of the inner wall. The outer wall being spaced apart from the outer wall defining a pressure cavity between the inner and outer walls. The pumping cavity outlet is in fluid communication with the pressure cavity. As such, the pressure cavity may be supplied with high pressure fluid that is pumped. The gear pump includes a pair of pumping gears between the pumping cavity inlet and pumping cavity outlet.

13 Claims, 11 Drawing Sheets

FIG. 11

HIGH PRESSURE GEAR PUMP WITH DUAL WALL HOUSING

FIELD OF THE INVENTION

This invention generally relates to pumps and more particularly to gear pumps and even more particularly to housings for gear pumps.

BACKGROUND OF THE INVENTION

Pumps are used to displace fluid to either move the fluid through a system, increase the pressure of the fluid or a combination of both move the fluid and increase the fluid pressure. One particular type of pump is a gear pump that includes a pair of cooperating gears that have intermeshing gear teeth that force fluid through a housing from a low pressure inlet to a high pressure outlet. The pair of gears is typically supported within the housing by bearings on opposite axial sides of the gear teeth.

Conventional gear pumps are relative inexpensive and simple. Unfortunately, when these gear pumps are used to generate large discharge pressures, the housing is exposed to these high pressures. The high pressures can cause localized deflections and high stress areas at the function parts of the housing that disturb operation of the pump bearings, reduce operational life, and reduce the ability to produce such high discharge pressures.

Embodiments of the invention provide improvements over the state of the art.

BRIEF SUMMARY OF THE INVENTION

Embodiments of the invention provide improved housings for gear pumps that reduce or eliminate housing wall deflections and stress points. Gear pumps utilizing such housings are also provided.

In one embodiment, a gear pump housing includes an inner wall and an outer wall. The inner wall defines an inner pumping cavity having a pumping cavity inlet and a pumping cavity outlet. The outer wall surrounds at least part of the inner wall. The outer wall being spaced apart from the outer wall defining a pressure cavity between the inner and outer walls. The pumping cavity outlet is in fluid communication with the pressure cavity. As such, the pressure cavity may be supplied with high pressure fluid that is pumped.

In a particular embodiment, the pump housing is an assembly of a components including: an inner housing member that defines the inner wall; and an outer housing member that defines the outer wall. The inner housing member is positioned within the outer housing member.

In one embodiment, the inner housing member defines a high pressure outlet. The pressure cavity fluidly couples the pumping cavity outlet with the high pressure outlet of the housing.

In one embodiment, the outer housing member is an annular sleeve that surrounds a portion of the inner housing member.

In one embodiment, the housing includes first and second seal members interposed between the inner and outer housing members. The first and second seal members being positioned proximate opposite axial ends of the pressure cavity.

In one embodiment, the outer housing member does not provide any inlet through which low pressure fluid enters the pump housing or any high pressure outlet through which high pressure fluid exits the pump housing.

In one embodiment, the housing includes an end plate operably mounted to the inner housing member. The end plate closing at least a portion of the pumping cavity.

In one embodiment, the outer housing member is generally bowl shaped having a generally open end and a closed end. The open end being sized to receive the inner housing member therethrough. The housing further includes an end plate mounted at an opposite end of the closed end of the outer housing member. The end plate closing off at least a portion of the pressure cavity and a portion of the pumping cavity.

In another embodiment, a gear pump having a pump housing and a pair of pumping gears is provided. The pump housing includes an inner wall and an outer wall. The inner wall defines an inner pumping cavity having a pumping cavity inlet and a pumping cavity outlet. The outer wall surrounds at least part of the inner wall. The outer wall is spaced apart from the outer wall defining a pressure cavity between the inner and outer walls. The pumping cavity outlet is in fluid communication with the pressure cavity. The pair of pumping gears is positioned within the inner pumping cavity between the pumping cavity inlet and pumping cavity outlet.

In one embodiment, the pair of pumping gears includes a drive gear and a driven gear. The drive gear is rotatably supported for rotation about a drive gear axis of rotation. The driven gear is rotatably supported for rotation about a driven gear axis of rotation. The driven gear axis of rotation is parallel to and laterally offset from the drive gear axis of rotation.

In one embodiment, the gear pump includes first, second, third and fourth pumping gear support bearings. The first and second pumping gear support bearings rotatably support the driven gear. The first and second pumping gear support bearings are located within the inner wall and within the inner pumping cavity, the third and fourth pumping gear support bearings rotatably supporting the drive gear, the third and fourth pumping gear support bearings being located within the inner wall and within the inner pumping cavity.

In one embodiment, each of the first, second, third and fourth pumping gear support bearings defines a bearing pressure chamber with the inner wall. The bearing pressure chambers are in fluid communication with the pumping cavity outlet such that pumped fluid is supplied to the bearing pressure chambers.

In one embodiment, the bearing pressure chambers are in fluid communication with the pumping cavity outlet through the pressure cavity.

In one embodiment, at least one flow passage extends through the inner wall connecting the pressure cavity with the bearing pressure chambers.

In one embodiment, the pump housing defines a high pressure outlet. The pressure cavity fluidly couples the pumping cavity outlet with the high pressure outlet.

In one embodiment, the pump housing is an assembly of components including an inner housing member that defines the inner wall; and an outer housing member that defines the outer wall.

In one embodiment, the inner housing member defines a high pressure outlet. The pressure cavity fluidly couples the pumping cavity outlet with the high pressure outlet.

In one embodiment, the outer housing member is an annular sleeve that surrounds a portion of the inner housing member.

In one embodiment, first and second seal members are interposed between the inner and outer housing members.

The first and second seal members are positioned proximate opposite axial ends of the pressure cavity. The seal members may be radially directed seal members.

In one embodiment, the outer housing member does not provide any inlet through which low pressure fluid enters the pump housing or any high pressure outlet through which high pressure fluid exits the pump housing.

In one embodiment, an end plate is operably mounted to the inner housing member. The end plate closing at least a portion of the pumping cavity.

In one embodiment, the outer housing member is generally bowl shaped having a generally open end and a generally closed end. The open end being sized to receive the inner housing member therethrough. An end plate is mounted at an opposite end of the closed end of the outer housing member. The end plate closing off at least a portion of the pressure cavity and a portion of the pumping cavity.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
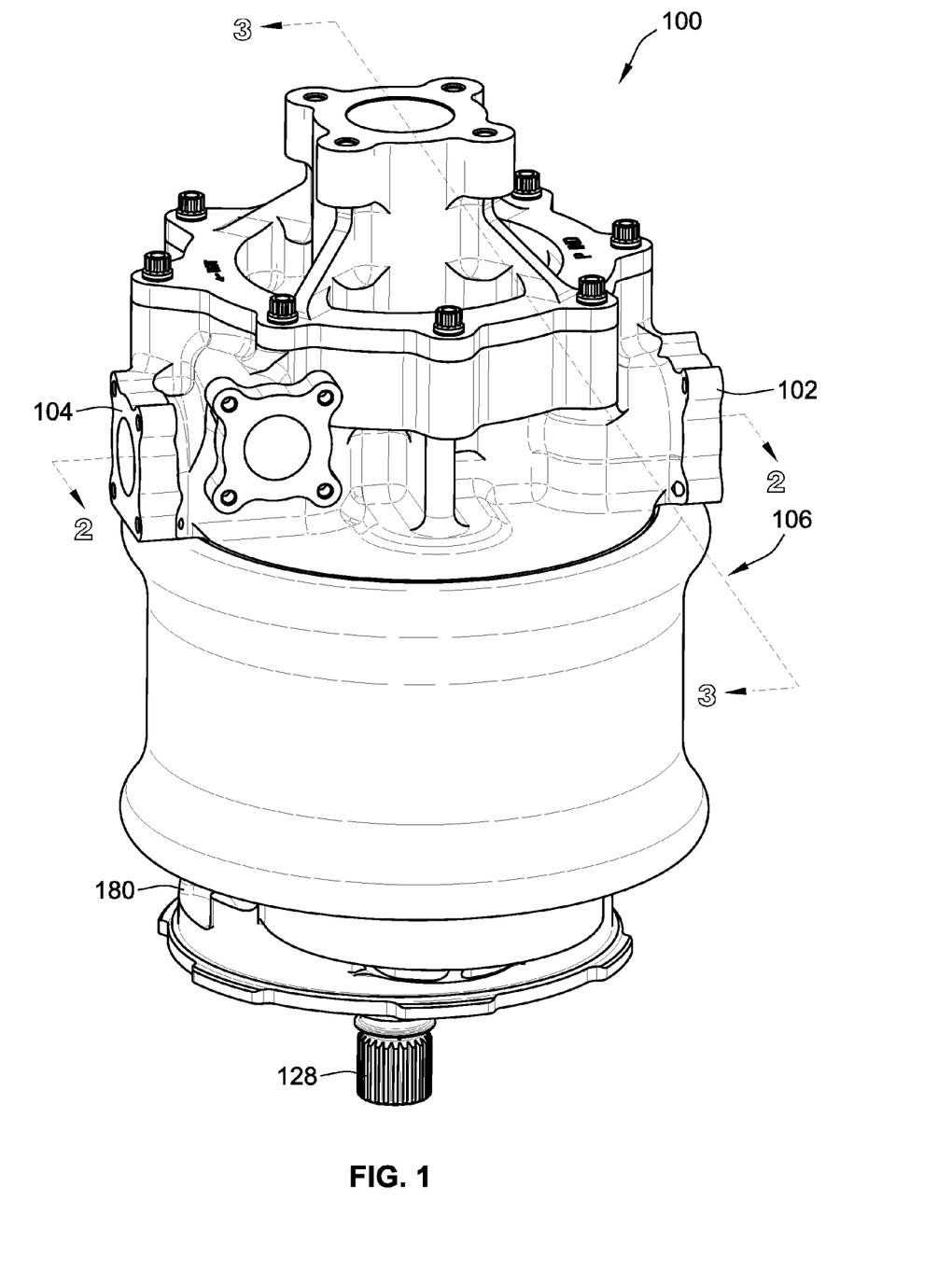
FIG. 1 is a perspective view of a gear pump according to an embodiment of the invention.

FIG. 1 illustrates a gear pump 100 according to an embodiment of the invention. The gear pump 100 includes an inlet 102 configured to be attached to a source of low pressure fluid and a high pressure outlet 104 configured to be attached to a downstream system that will utilize the fluid from the source.

The gear pump 100 includes a housing 106 that houses the internal components for pumping the fluid. In this embodiment, the housing 106 is formed from a plurality of components that are attached to one another.

Figure 2:
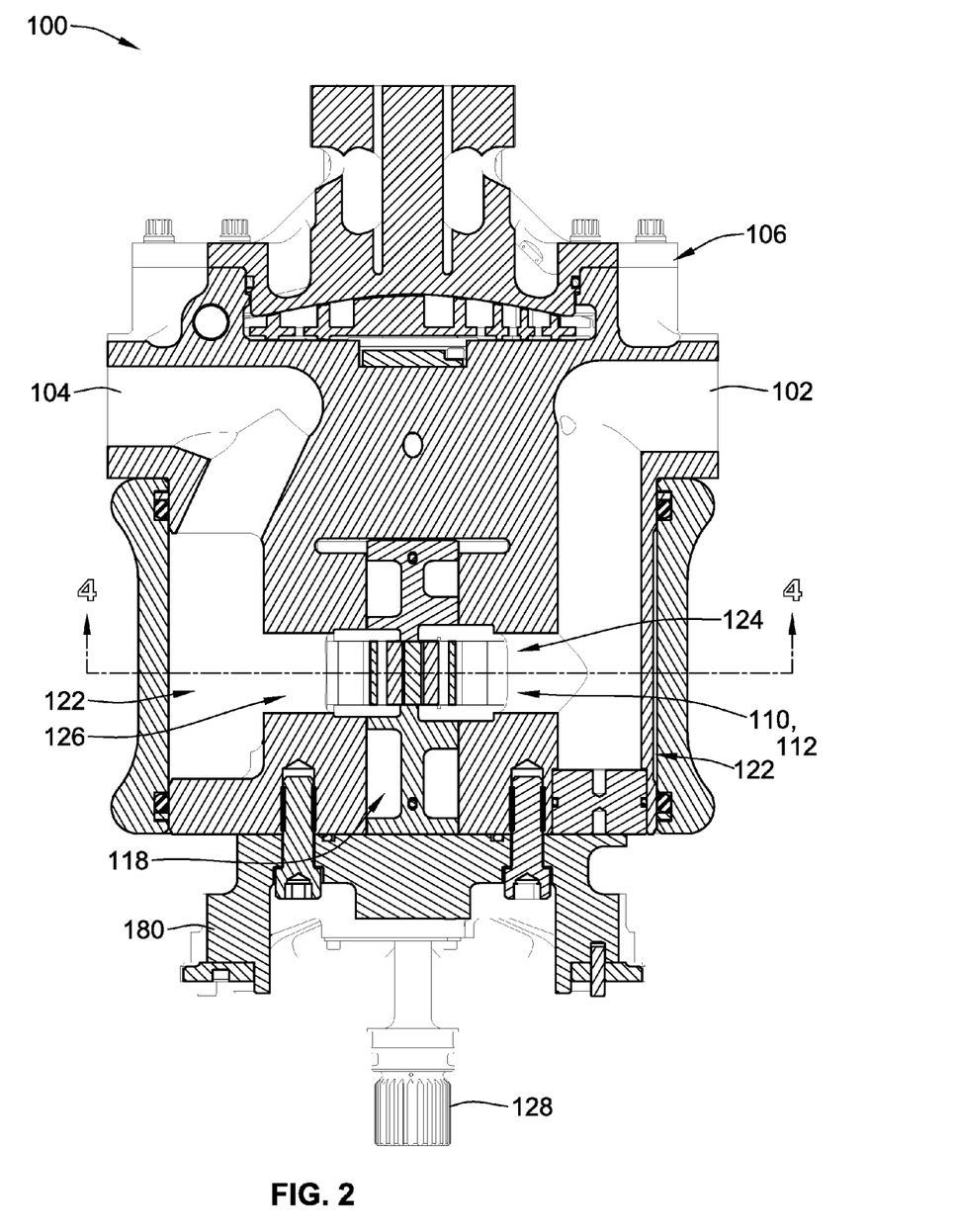
FIG. 2 is a cross-sectional illustration of the gear pump of FIG. 1 take about line 2-2 of FIG. 1.
Figure 3:
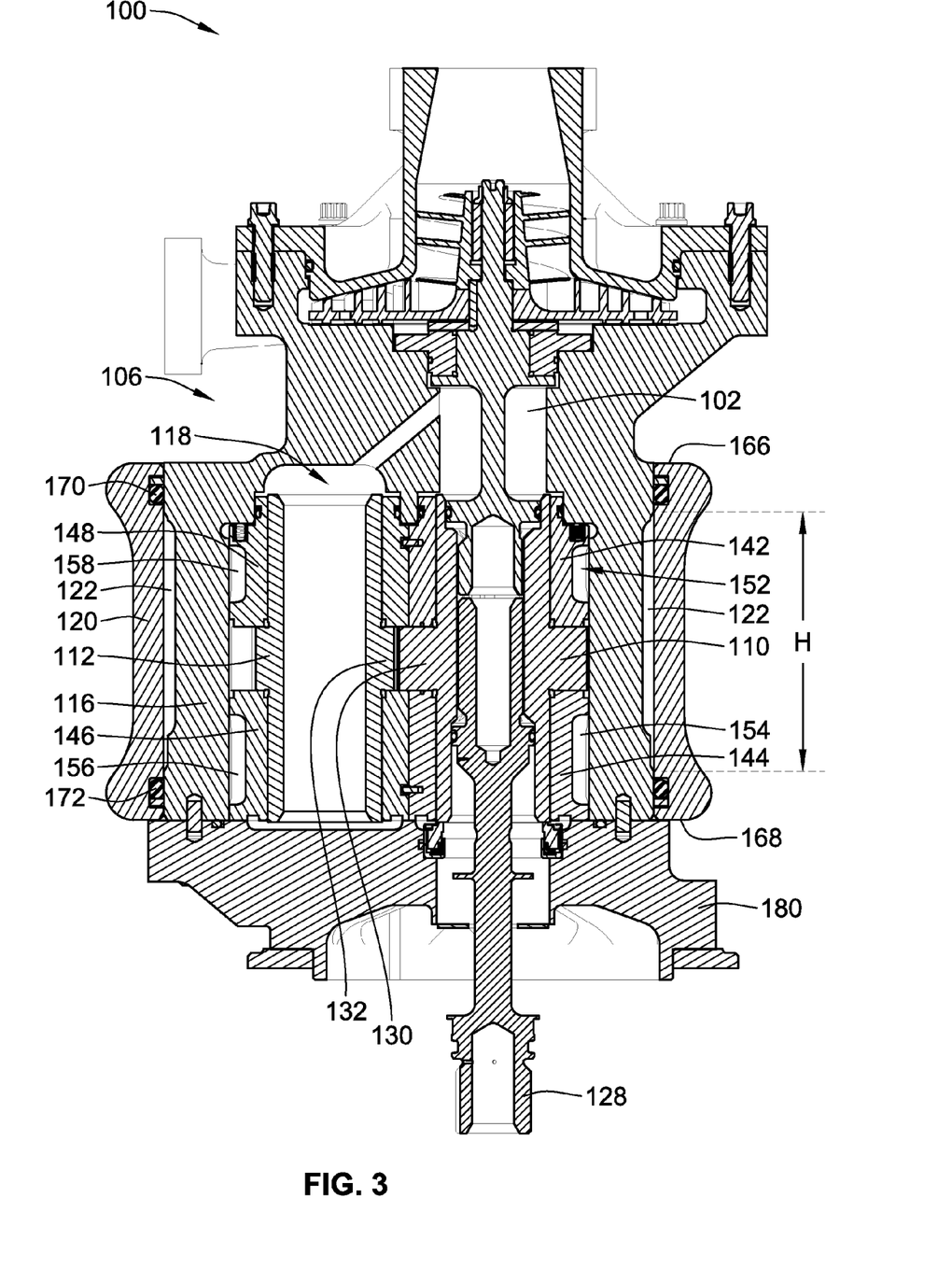
FIG. 3 is a cross-sectional illustration of the gear pump of FIG. 1 take about line 3-3 of FIG. 1.

As further illustrated with reference to FIGS. 2 and 3, the gear pump 100 is illustrated in cross-section taken about lines 2-2 and 3-3 in FIG. 1. Low pressure fluid enters housing 106 through inlet 102 and passes through a pair of intermeshed pumping gears 110, 112 and is ultimately pumped out of housing 106 through outlet 104.

Figure 4:
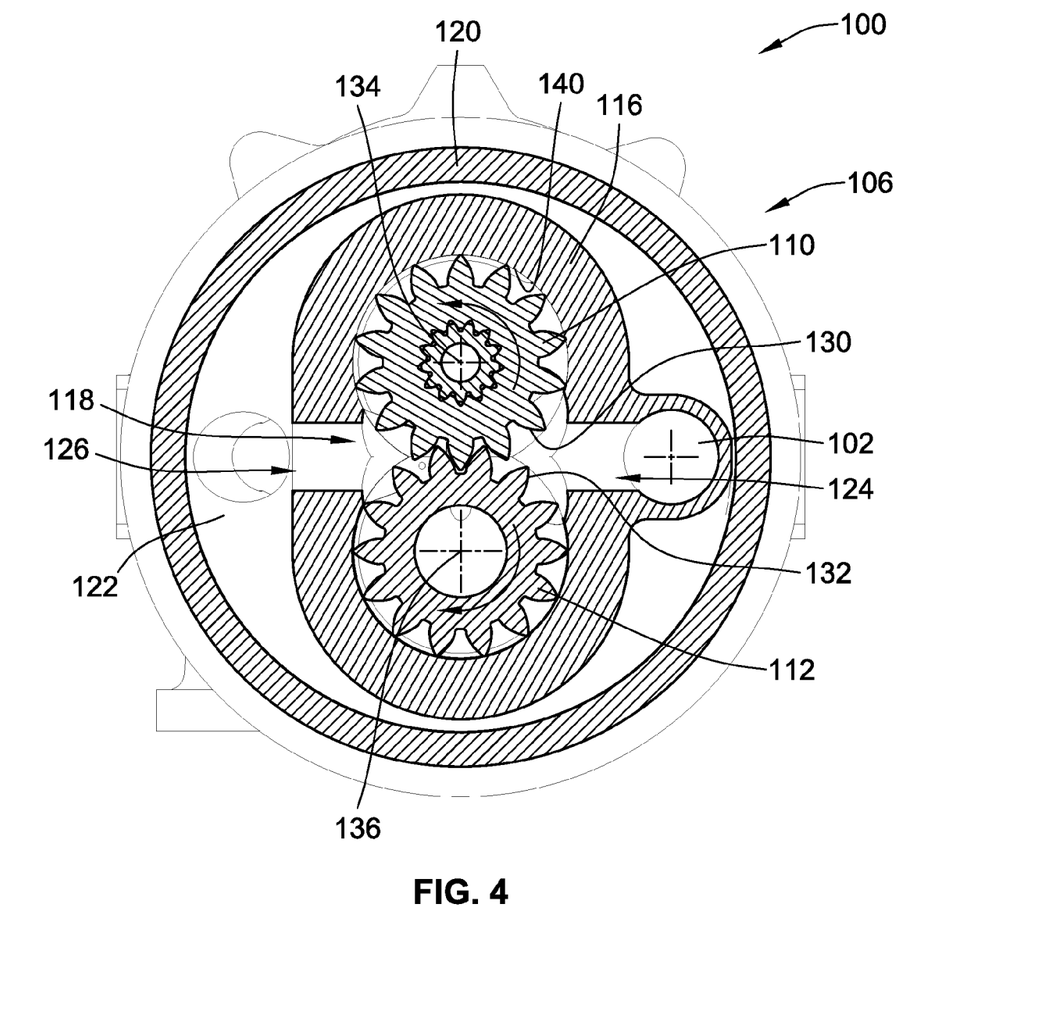
FIG. 4 is a simplified cross-sectional illustration of the gear pump of FIG. 1 taken about line 4-4 of FIG. 2.
Figure 5:
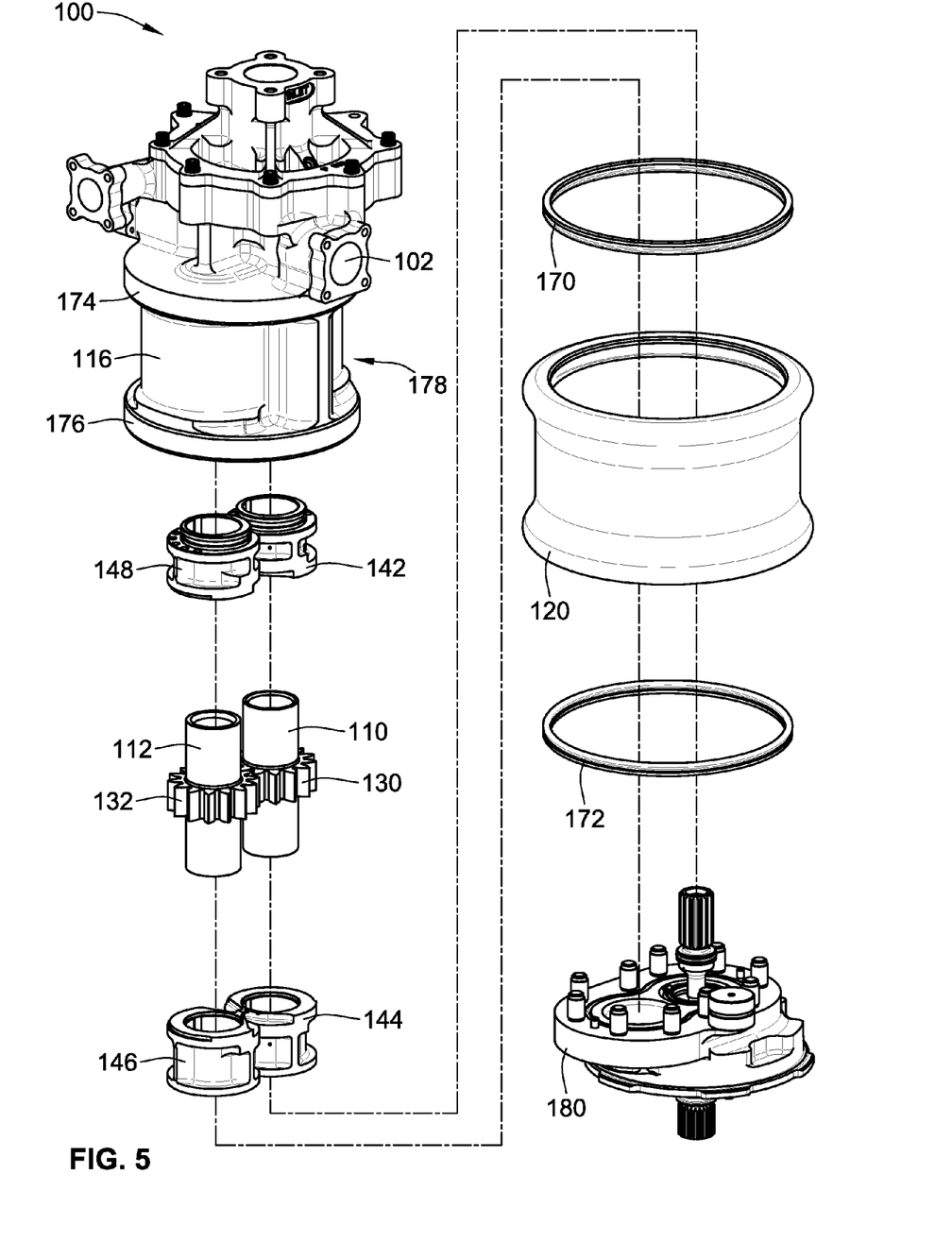
FIG. 5 is an exploded illustration of the gear pump of FIG. 1.
Figure 6:
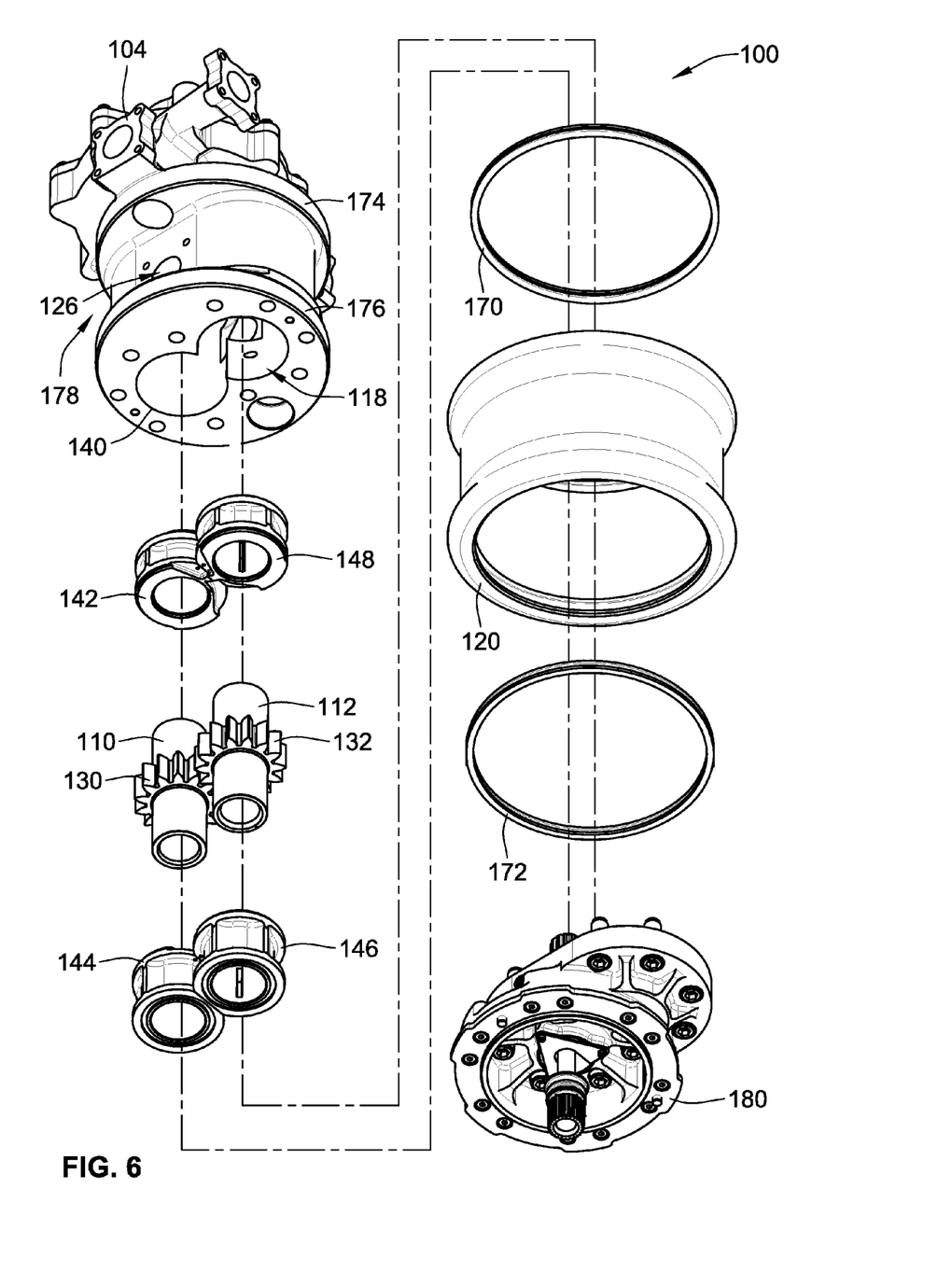
FIG. 6 is an exploded illustration of the gear pump of FIG. 1.
Figure 7:
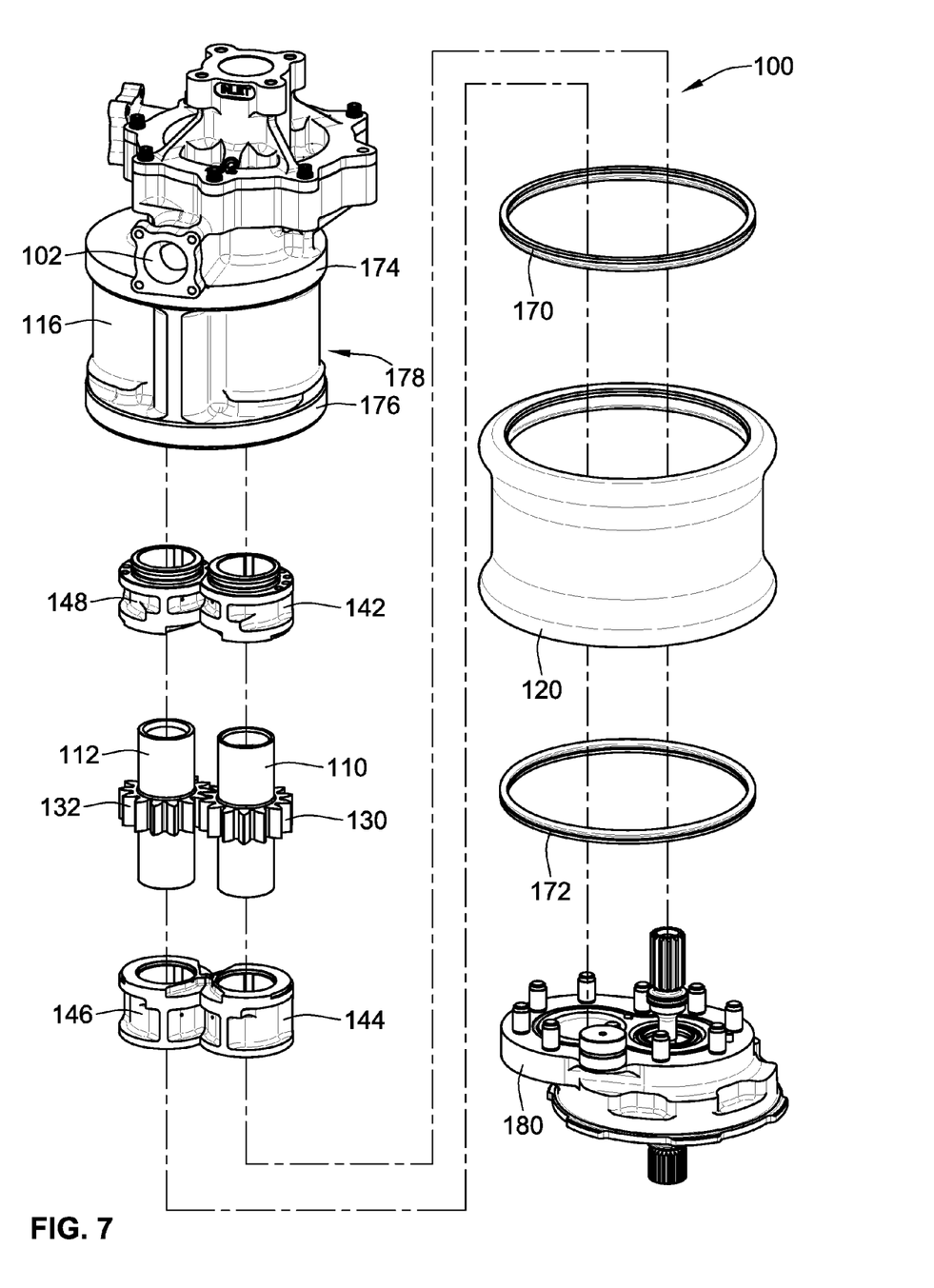
FIG. 7 is an exploded illustration of the gear pump of FIG. 1.
Figure 8:
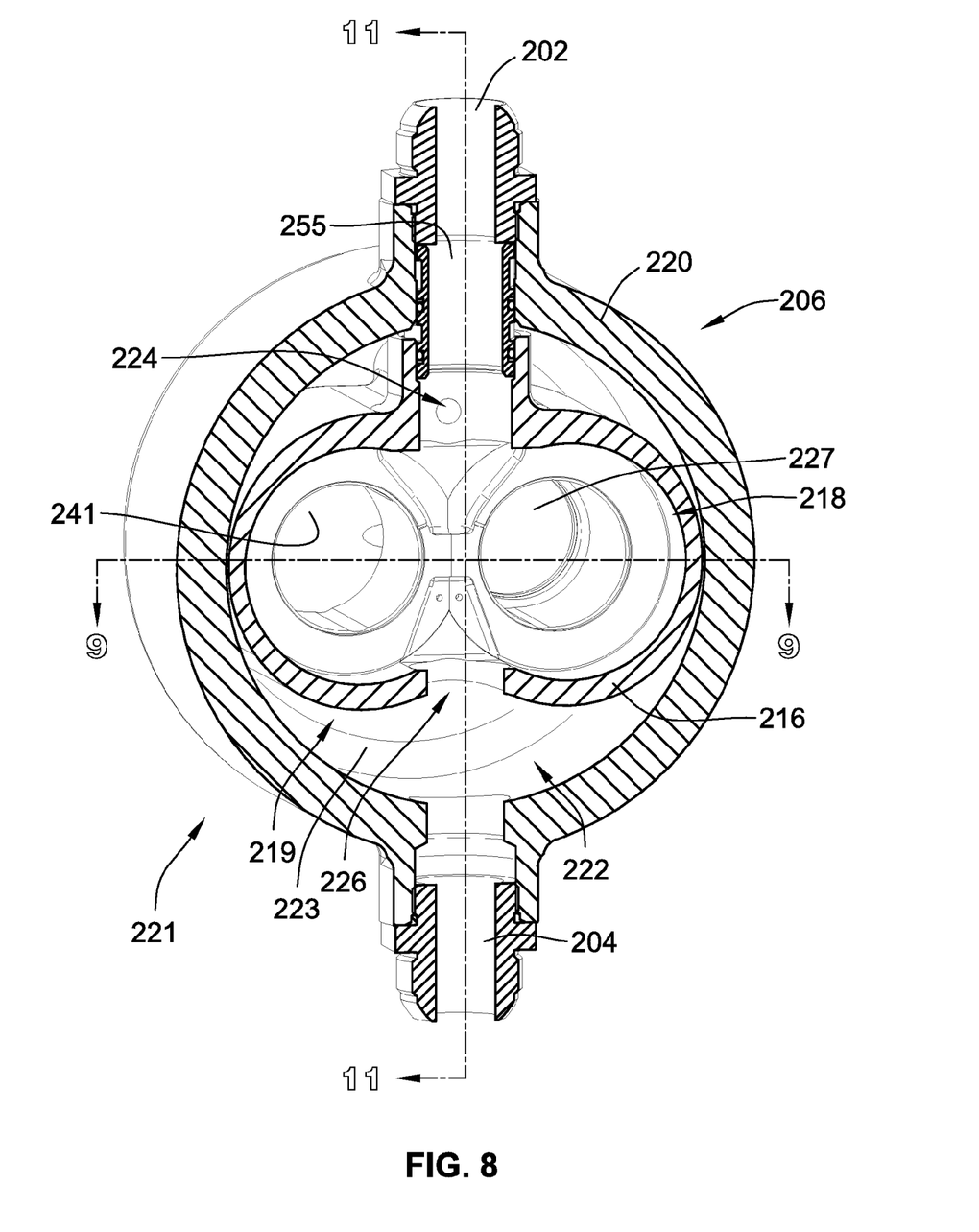
FIG. 8 is a cross-sectional illustration of another embodiment of a gear pump housing.
Figure 9:
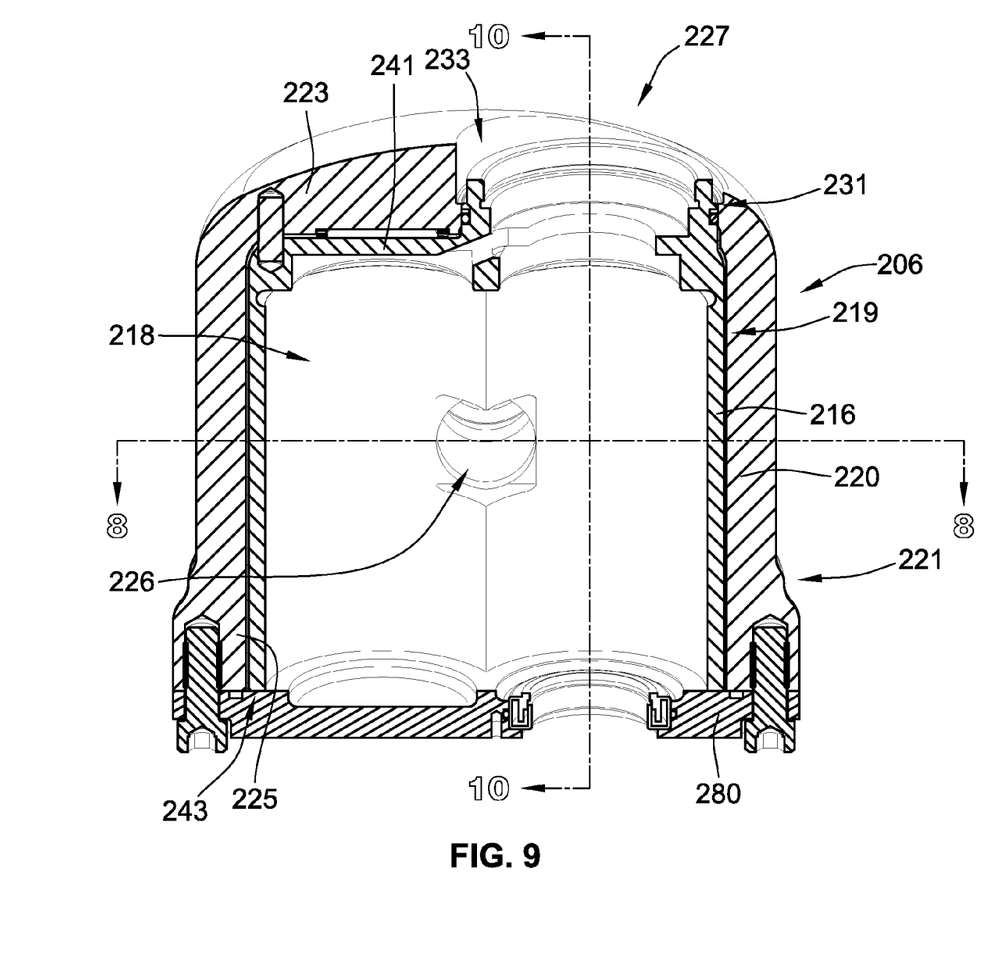
FIG. 9, is a cross-sectional illustration of the gear pump housing of FIG. 8, taken about line 9-9 of FIG. 8.
Figure 10:
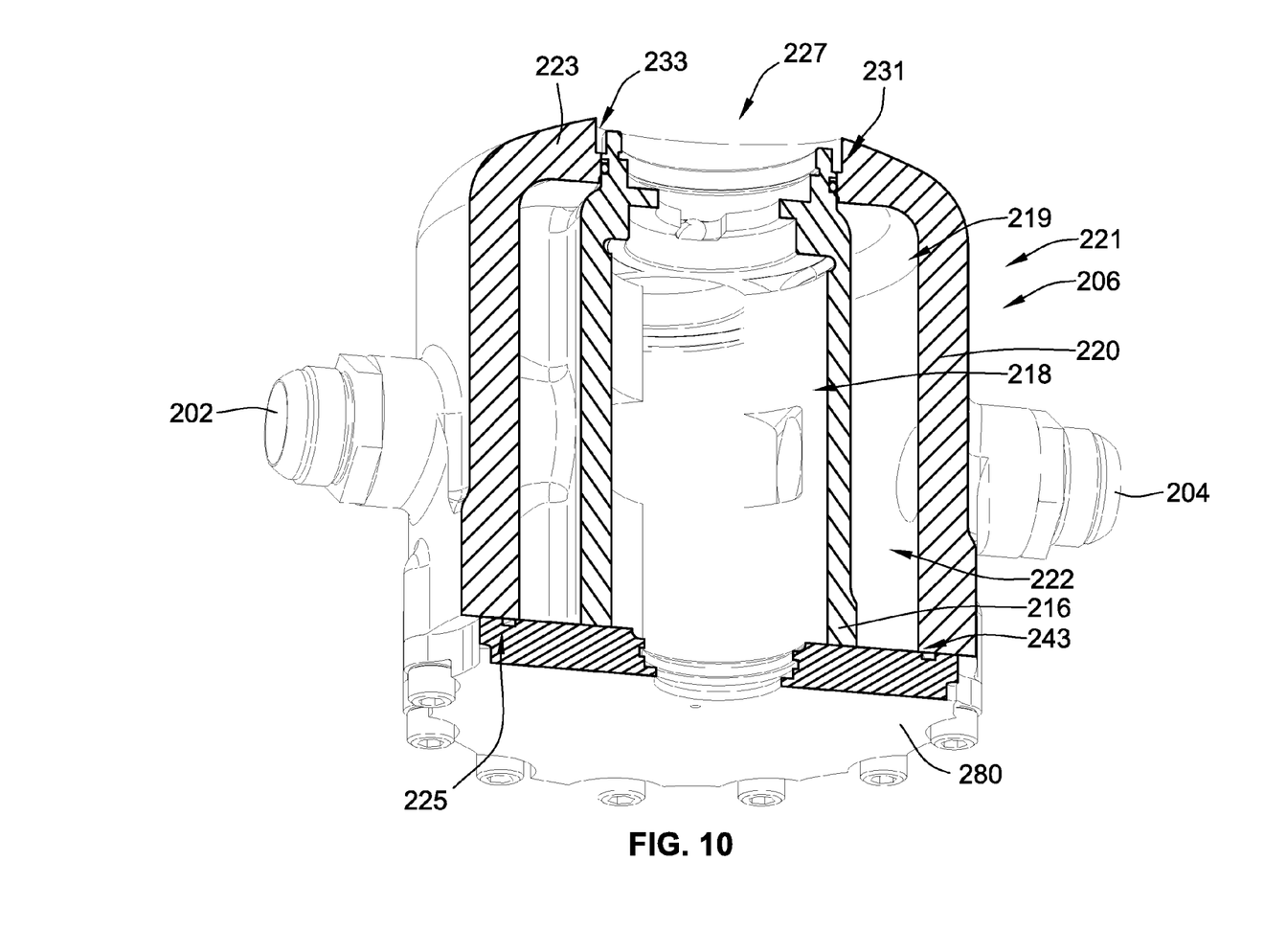
FIG. 10 is a cross-sectional illustration of the gear pump housing of FIG. 8, taken about line 10-10 of FIG. 9.
Figure 11:
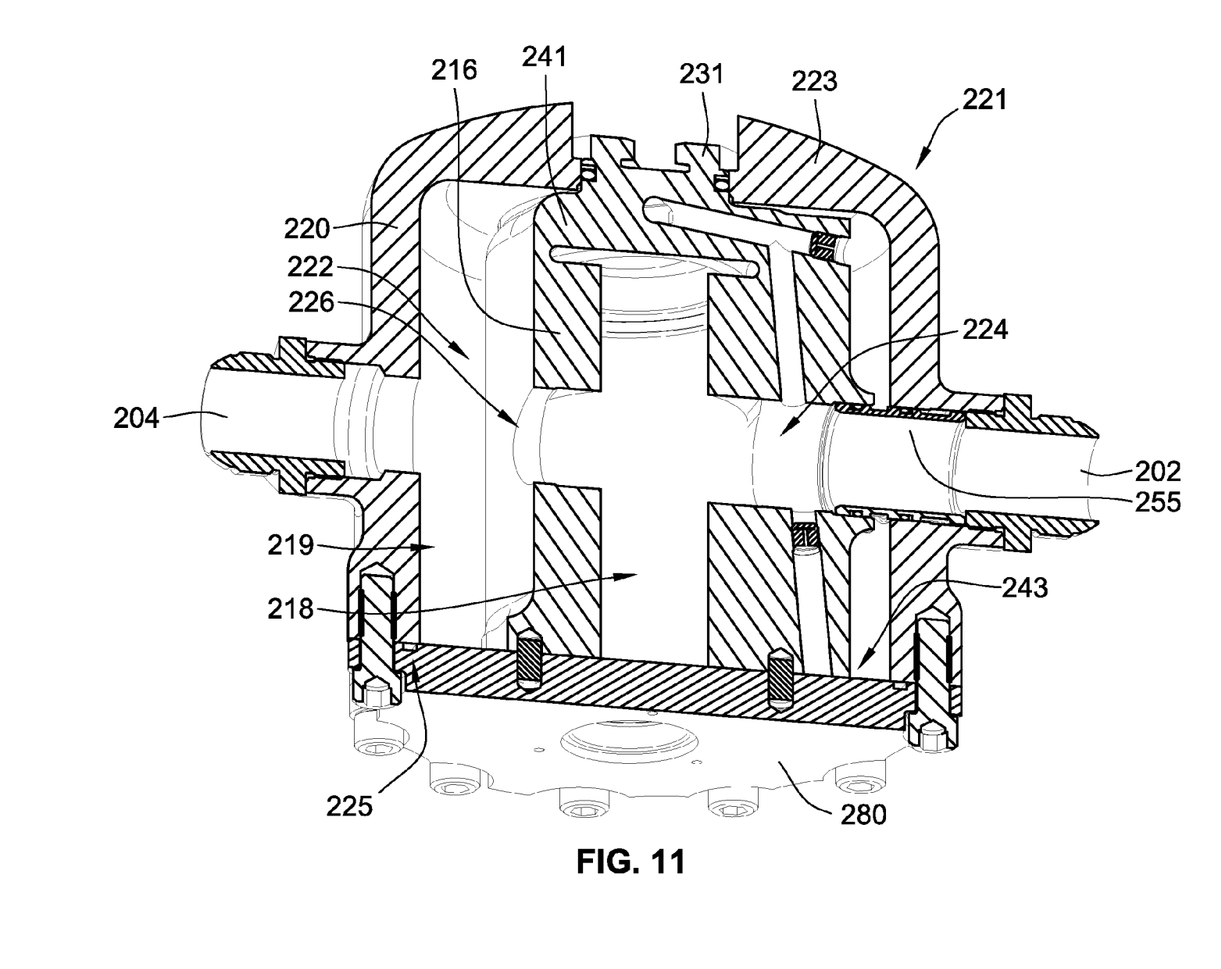
FIG. 11 is a cross-sectional illustration of the gear pump housing of FIG. 8, taken about line 11-11 of FIG. 8.

With additional reference to FIG. 4, the housing 106 is a dual wall housing that has an inner wall 116 that defines an inner pumping cavity 118. The housing 106 includes an outer wall 120 that surrounds, at least in part, and preferably entirely, the inner wall 116. The outer wall 120 is spaced radially outward from the inner wall 116. The inner and outer walls 116, 120 define a pressure cavity 122 radially therebetween that substantially, if not entirely, surrounds the inner wall 116.

The inner pumping cavity 118 defines a pumping cavity inlet 124 and a pumping cavity outlet 126. The pair of pumping gears 110, 112 are rotatably mounted within the inner pumping cavity 118 between the pumping cavity inlet 124 and the pumping cavity outlet 126. The pumping cavity outlet 126 is in fluid communication with the pressure cavity 122 defined between the inner and outer walls 116, 120. The high pressure fluid exiting the inner pumping cavity 118 therefore surrounds the inner wall 116. This high pressure fluid that surrounds the inner wall 116 balances the pressures across the inner wall 116 to prevent deflections of the inner wall due to the high pressures generated within the pumping cavity 118.

The outlet 104 out of the housing 106 is fluidly coupled to pumping cavity outlet 126 thorough the pressure cavity 122.

The intermeshing pumping gears 110, 112 include drive gear 110 and driven gear 112. The drive gear 110 is mechanically driven by an external source connected to drive shaft 128 that is coupled to the drive gear 110. The teeth 130 of the drive gear 110 intermesh with and engage teeth 132 of the driven gear. As the drive gear 110 rotates about its rotational axis 134 the drive gear 110 drives the driven gear 112 about its rotational axis 136, which is laterally offset from and parallel to rotational axis 134. Further, as the teeth 130, 132 intermesh they create a seal to help assist in pumping the fluid.

The fluid that is pumped from the pumping cavity inlet 124 is trapped within the grooves between adjacent teeth 130, 132 and the inner surface 140 of the inner wall 116.

The gears 110, 112 are rotatably supported within the inner pumping cavity 118 by pumping gear support bearings 142, 144, 146, 148 located within the inner pumping cavity 118. The inner wall 116 and the pumping gear support bearings 142, 144, 146, 148 define bearing pressure chambers 152, 154, 156, 158 that are in fluid communication with the high pressure fluid that is pumped by gears 110, 112. The individual bearing pressure chambers 152, 154, 156, 158 may be interconnected to form larger chambers or be separate discrete chambers depending on the embodiment. The pumping gear support bearings 142, 144, 146, 148 are sized and/or shaped relative to the inner surface of the inner wall 116 such that the high pressure fluid can go around the bearings.

In this embodiment, the inner and outer walls 116, 120 are separate housing components. The outer wall 120 is provided by a generally annular sleeve that is open at opposed ends 166, 168 that permit the inner wall to be axially inserted into the cavity formed by the outer wall 120. Gaskets 170, 172 seal the outer wall 120 to the inner wall 116 to form the pressure cavity between the inner and outer walls 116, 120. More particularly, the gaskets 170, 172 seal against sealing surfaces 174, 176. The outer surface of the inner wall 116 includes an annular recess 178 that helps define the pressure cavity 122 when the outer wall 120 is mounted to the inner wall 116.

The outer wall 120 and the sleeve that it forms are generally circular in cross section to reduce high stress areas. High stress areas limit housing pressure capabilities or result in high deflections which disturb reliable operation of the gears 110, 112 and bearings 142, 144, 146, 148.

The height H of the pressure chamber 122 is such that the pressure chamber 122 overlaps with a majority of the inner wall 116 that provides radial support for bearings 142, 144, 146, 148, and at least, proximate the portion of inner wall 116 that provides the working surface that cooperates with gear teeth 130, 132 during pumping operations.

The housing 106 includes an end plate 180 that is operably attached to the inner and outer walls 116, 120 to close, at least in part, one of the axial ends of the inner pumping cavity 118. In this embodiment, the end plate 180 is directly attached to the inner wall 116.

In this embodiment, the inlet and outlet 102, 104 are formed by the inner housing component that includes the inner wall 116. None of the inlets or outlets 102, 104 are provided by the outer housing member that defines the outer wall 120. As such all of the low pressure fluid enters the gear pump 100 through the inner housing member and all of the high pressure fluid exits the gear pump 100 from the inner housing member.

While the prior embodiment has the inner wall 116 and outer wall 120 formed from separate components, these two walls and the cavities that they form could be formed by a single component that defines both walls and the cavities.

FIGS. 8-11 illustrate a further embodiment of a housing 206 that provides a dual wall housing that includes a pumping cavity 218 and a pressure cavity 222. The pumping cavity 218 is defined by an inner wall 216 and the pressure cavity 222 is formed between the inner wall 216 and an outer wall 220.

In this embodiment, the inner wall 216 and pumping cavity 218 are formed as part of a housing component that is in the form of a cartridge 219 that is inserted into a cup shaped housing component 221 that defines the outer wall 220.

The cup shaped housing component 221 also defines a generally closed end 223 opposite an open end 225 sized to receive cartridge 219 therethrough for mounting within the cavity defined by the cup shaped housing component 221.

To allow for connection to an optional boost stage (not shown), the closed end 223 of housing component 221 includes an opening 227. Cartridge 219 includes an axially extending hub 231 that extends into and seals within a recess 233 formed in the closed end 223. The hub 231 includes a passage way that communicates the pumping cavity 218 with opening 227 in closed end 223. The hub 231 also includes internal passages that are connected to the low pressure fluid supply, such as to the pumping cavity inlet 224 (illustrated in FIG. 11). The internal structure of hub 231 is configured and sized to provide some pressure balancing in the axial direction depending on which surface is exposed to low pressure and which surface is exposed to high pressure.

The cartridge 219 is also generally cup shaped including closed end 241 that is opposite open end 243. When assembled closed end 223 of the cup shaped housing component 221 is positioned adjacent the closed end 241 of cartridge 219.

An end plate 280 is attached proximate the open ends 225, 243 to close both the pressure cavity 222 and the pumping cavity 218.

The housing 206 also defines an inlet 202 and an outlet 204 for supplying low pressure fluid and expelling high pressure fluid. The inlet 202 and outlet 204 extend through outer wall 220. However, in other embodiments, the inlet 202 and outlet 204 could extend through the closed end 223 of housing component 221 or may extend through the end plate 280. Again, the pressure cavity 222 is interposed between outlet 204 and the pumping cavity outlet 226.

In this embodiment, a radially extending connector 255 fluidly connects the inlet 202 with a pumping cavity inlet 224.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A gear pump housing comprising:
   a pump housing having:
      an inner wall defining an inner pumping cavity having a pumping cavity inlet and a pumping cavity outlet; and
      an outer wall surrounding at least a portion of the inner wall, the outer wall being spaced apart from the inner wall defining a pressure cavity between the inner and outer walls, the pumping cavity outlet being in fluid communication with the pressure cavity;

wherein the pump housing is an assembly of components including:

an inner housing member that defines the inner wall, wherein the inner housing member defines a high pressure outlet, the pressure cavity fluidly coupling the pumping cavity outlet with the high pressure outlet; and an outer housing member that defines the outer wall.

2. The gear pump housing of claim 1, wherein the outer housing member is an annular sleeve that surrounds a portion of the inner housing member.

3. The gear pump housing of claim 2, wherein the outer housing member does not provide any inlet through which low pressure fluid enters the pump housing or any high pressure outlet through which high pressure fluid exits the pump housing.

4. The gear pump housing of claim 1, further comprising an end plate operably mounted to the inner housing member, the end plate closing at least a portion of the pumping cavity.

5. A gear pump housing comprising:
a pump housing having:
an inner wall defining an inner pumping cavity having a pumping cavity inlet and a pumping cavity outlet; and
an outer wall surrounding at least a portion of the inner wall, the outer wall being spaced apart from the inner wall defining a pressure cavity between the inner and outer walls, the pumping cavity outlet being in fluid communication with the pressure cavity;
wherein the pump housing is an assembly of components including:
an inner housing member that defines the inner wall, wherein the inner housing member defines a high pressure outlet, the pressure cavity fluidly coupling the pumping cavity outlet with the high pressure outlet; and
an outer housing member that defines the outer wall, wherein the outer housing member is an annular sleeve that surrounds a portion of the inner housing member; and
further comprising first and second seal members interposed between the inner and outer housing members, the first and second seal members being positioned proximate opposite axial ends of the pressure cavity.

6. A gear pump housing comprising:
a pump housing having:
an inner wall defining an inner pumping cavity having a pumping cavity inlet and a pumping cavity outlet; and
an outer wall surrounding at least a portion of the inner wall, the outer wall being spaced apart from the inner wall defining a pressure cavity between the inner and outer walls, the pumping cavity outlet being in fluid communication with the pressure cavity;
wherein the pump housing is an assembly of components including:
an inner housing member that defines the inner wall; and
an outer housing member that defines the outer wall;
wherein the outer housing member is generally bowl shaped having a generally open end and a closed end, the open end being sized to receive the inner housing member therethrough;
further comprising an end plate mounted at an opposite end of the closed end of the outer housing member, the end plate closing off at least a portion of the pressure cavity and a portion of the pumping cavity.

7. A gear pump comprising:
a pump housing having:
an inner wall defining an inner pumping cavity having a pumping cavity inlet and a pumping cavity outlet;
an outer wall surrounding at least a portion of the inner wall, the outer wall being spaced apart from the inner wall defining a pressure cavity between the inner and outer walls, the pumping cavity outlet being in fluid communication with the pressure cavity; and
a pair of pumping gears positioned within the inner pumping cavity between the pumping cavity inlet and pumping cavity outlet, wherein the pair of pumping gears includes a drive gear and a driven gear, the drive gear is rotatably supported for rotation about a drive gear axis of rotation, the driven gear is rotatably supported for rotation about a driven gear axis of rotation, the driven gear axis of rotation is parallel to and laterally offset from the drive gear axis of rotation;
first, second, third and fourth pumping gear support bearings, the first and second pumping gear support bearings rotatably supporting the driven gear, the first and second pumping gear support bearings being located within the inner wall and within the inner pumping cavity, the third and fourth pumping gear support bearings rotatably supporting the drive gear, the third and fourth pumping gear support bearings being located within the inner wall and within the inner pumping cavity, wherein each of the first, second, third and fourth pumping gear support bearings defines a bearing pressure chamber with the inner wall, the bearing pressure chambers being in fluid communication with the pumping cavity outlet such that pumped fluid is supplied to the bearing pressure chambers; and
wherein the bearing pressure chambers are in fluid communication with the pumping cavity outlet through the pressure cavity.

8. A gear pump comprising:
a pump housing having:
an inner wall defining an inner pumping cavity having a pumping cavity inlet and a pumping cavity outlet;
an outer wall surrounding at least a portion of the inner wall, the outer wall being spaced apart from the inner wall defining a pressure cavity between the inner and outer walls, the pumping cavity outlet being in fluid communication with the pressure cavity; and
a pair of pumping gears positioned within the inner pumping cavity between the pumping cavity inlet and pumping cavity outlet;
wherein the pump housing is an assembly of components including:
an inner housing member that defines the inner wall, wherein the inner housing member defines a high pressure outlet, the pressure cavity fluidly coupling the pumping cavity outlet with the high pressure outlet; and
an outer housing member that defines the outer wall.

9. The gear pump of claim 8, wherein the outer housing member is an annular sleeve that surrounds a portion of the inner housing member.

10. A gear pump comprising:
a pump housing having:
   an inner wall defining an inner pumping cavity having a pumping cavity inlet and a pumping cavity outlet;
   an outer wall surrounding at least a portion of the inner wall, the outer wall being spaced apart from the inner wall defining a pressure cavity between the inner and outer walls, the pumping cavity outlet being in fluid communication with the pressure cavity; and
a pair of pumping gears positioned within the inner pumping cavity between the pumping cavity inlet and pumping cavity outlet;
wherein the pump housing is an assembly of components including:
   an inner housing member that defines the inner wall, wherein the inner housing member defines a high pressure outlet, the pressure cavity fluidly coupling the pumping cavity outlet with the high pressure outlet; and
   an outer housing member that defines the outer wall, wherein the outer housing member is an annular sleeve that surrounds a portion of the inner housing member; and
   first and second seal members interposed between the inner and outer housing members, the first and second seal members being positioned proximate opposite axial ends of the pressure cavity.

11. The gear pump of claim 9, wherein the outer housing member does not provide any inlet through which low pressure fluid enters the pump housing or any high pressure outlet through which high pressure fluid exits the pump housing.

12. The gear pump of claim 8, further comprising an end plate operably mounted to the inner housing member, the end plate closing at least a portion of the pumping cavity.

13. A gear pump comprising:
a pump housing having:
   an inner wall defining an inner pumping cavity having a pumping cavity inlet and a pumping cavity outlet;
   an outer wall surrounding at least a portion of the inner wall, the outer wall being spaced apart from the inner wall defining a pressure cavity between the inner and outer walls, the pumping cavity outlet being in fluid communication with the pressure cavity; and
a pair of pumping gears positioned within the inner pumping cavity between the pumping cavity inlet and pumping cavity outlet;
wherein the pump housing is an assembly of components including:
   an inner housing member that defines the inner wall; and
   an outer housing member that defines the outer wall, wherein the outer housing member is generally bowl shaped having a generally open end and a closed end, the open end being sized to receive the inner housing member therethrough;
   further comprising an end plate mounted at an opposite end of the closed end of the outer housing member, the end plate closing off at least a portion of the pressure cavity and a portion of the pumping cavity.

* * * * *